UNITED STATES PATENT OFFICE.

SOLOMON BENNETT, OF LONDON, ENGLAND.

WATERPROOF ARTICLE AND PROCESS OF PREPARING IT.

SPECIFICATION forming part of Letters Patent No. 578,714, dated March 16, 1897.

Application filed June 20, 1896. Serial No. 596,310. (No specimens.)

*To all whom it may concern:*

Be it known that I, SOLOMON BENNETT, a subject of the Queen of Great Britain, residing at 117 Richmond Road, Dalston, London, in the county of Middlesex, England, have invented certain new and useful Improvements in Waterproof Articles and in Processes of Preparing Them, of which the following is a specification.

The object of my invention is to so treat wood, paper fabrics, fibers, and like materials as to render them impervious and unalterable by moisture and climate and other influences, and to also make the materials non-absorbent, non-corrosive, resisting the action of water, diluted acids, and alkali, spirit, turpentine, fats, and most chemicals.

The process which I employ may be favorably applied in the following way: The materials to be treated, after being dried thoroughly, are dipped in or covered with oil or a solution of oil in a suitable solvent, as turpentine.

When this application has thoroughly soaked in and the material is saturated throughout or to a sufficient depth, the surface is treated with a solution of nitrocellulose in acetone, ether alcohol, amyl acetate, or some other solvent of nitrocellulose. The nitrocellulose solution may be used alone, or turpentine, sanitas-oil, creosote, or other disinfectant may be added to it. The nitrocellulose will be found thoroughly to adhere to the material, to some extent penetrating the same and combining with the oil with which it meets. The elasticity and flexibility of the nitrocellulose are increased by this combination.

A second coating of nitrocellulose solution may be applied where advisable, and this, if desired, may be modified by the addition of oil.

Suitable proportions have been found to be, for the first coat, one part oil (as castor-oil or linseed) and one part turpentine, and for the second coat one part nitrocellulose, two parts turpentine, and three parts ether alcohol or amyl acetate, or the combination of the two. By this treatment the durability and strength of the materials are considerably increased, the cleansing of the same is greatly facilitated, and in the case of casks losses from various sources are made almost impossible.

It is well known that in the manufacture of oil-skin, oil-paper, &c., linseed and other drying oils are subject to spontaneous ignition or silent combustion due to the intense oxidation of these oils in contact with atmospheric air. On the other hand, all non-drying oils become rancid, thereby acquiring an objectionable smell and flavor, which contaminate goods brought into contact with them; but according to my invention I promptly absorb oils by the subsequent application of a nitrocellulose compound while these oils are still in a liquid condition, and thus I prevent subsequent oxidation.

I claim—

1. As a new article of manufacture, a fibrous material saturated with oily liquid and having a strongly-adherent, partially-penetrating coat of nitrocellulose.

2. The process herein described, which consists in saturating fibrous material with oily liquid and then applying a coating of nitrocellulose solution, which penetrate partially into the material thus saturated.

SOLOMON BENNETT.

Witnesses:
 EDMUND S. SNEWIN,
 PERCY E. MATTOCKS.